US011387652B2

(12) United States Patent
Padmarao et al.

(10) Patent No.: US 11,387,652 B2
(45) Date of Patent: Jul. 12, 2022

(54) SYSTEMS AND METHODS FOR ENHANCED REACTIVE POWER MANAGEMENT IN A HYBRID ENVIRONMENT

(71) Applicant: General Electric Company, Schenectady, NY (US)

(72) Inventors: Veena Padmarao, Karnataka (IN); Arvind Kumar Tiwari, Niskayuna, NY (US); Aditya Vyas, Karnataka (IN); Karen Emanuelle Hernandez Pagan, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 294 days.

(21) Appl. No.: 16/824,569

(22) Filed: Mar. 19, 2020

(65) Prior Publication Data
US 2021/0296898 A1    Sep. 23, 2021

(51) Int. Cl.
*H02J 3/18* (2006.01)
*H02J 13/00* (2006.01)
(Continued)

(52) U.S. Cl.
CPC ............ *H02J 3/18* (2013.01); *G05B 13/0265* (2013.01); *G05B 13/042* (2013.01); *H02J 3/004* (2020.01);
(Continued)

(58) Field of Classification Search
CPC ...... H02J 3/18; H02J 3/004; H02J 3/32; H02J 3/381; H02J 13/00006; H02J 2300/24;
(Continued)

(56) References Cited

U.S. PATENT DOCUMENTS 5,225,712 A   7/1993  Erdman
9,325,173 B2  4/2016  Varma et al.
(Continued)

FOREIGN PATENT DOCUMENTS

CN   105186969 B    4/2017
EP      2955807 A   12/2015
WO   2018006920 A1   1/2018

OTHER PUBLICATIONS

Ellis et al., "Reactive power performance requirements for wind and solar plants," IEEE Power and Energy Society General Meeting, pp. 1-8, San Diego, CA, 2012.
(Continued)

*Primary Examiner* — Ziaul Karim
(74) *Attorney, Agent, or Firm* — Armstrong Teasdale LLP

(57) ABSTRACT

A system for controlling a hybrid power generation plant is provided. The system is programmed to receive current conditions at the plurality of power generating assets including a first asset type and a second asset type, determine a forecast for a period of time based at least in part on the current conditions, determine that a first asset of the first asset type of the plurality of power generating assets has an available uprate margin for production of a first amount of active power, determine that a second asset of the second asset type of the plurality of power generating assets has capacity to generate a second amount of reactive power, instruct the first asset to reduce production of reactive power by the second amount and increase production of active power by the first amount, and instruct the second asset to increase production of reactive power by the second amount.

21 Claims, 9 Drawing Sheets

(51) Int. Cl.
  *H02J 3/00*    (2006.01)
  *G05B 13/02*   (2006.01)
  *G05B 13/04*   (2006.01)
  *H02J 3/32*    (2006.01)
  *H02J 3/38*    (2006.01)

(52) U.S. Cl.
  CPC ................ *H02J 3/32* (2013.01); *H02J 3/381* (2013.01); *H02J 13/00006* (2020.01); *H02J 2300/24* (2020.01); *H02J 2300/28* (2020.01)

(58) Field of Classification Search
  CPC ...... H02J 2300/28; H02J 3/16; H02J 2300/20; H02J 2300/40; H02J 3/48; H02J 3/50; G05B 13/0265; G05B 13/042; Y02E 10/56; Y02E 40/30; Y04S 10/50
  See application file for complete search history.

(56) References Cited

U.S. PATENT DOCUMENTS

| | | | |
|---|---|---|---|
| 10,185,346 | B2 | 1/2019 | Matan et al. |
| 10,389,125 | B2 | 8/2019 | Wilkins et al. |
| 2011/0282500 | A1* | 11/2011 | Long .................. G05B 17/02 700/287 |
| 2012/0049636 | A1* | 3/2012 | Galbraith .............. H02J 3/46 307/82 |
| 2013/0293021 | A1* | 11/2013 | Varma ................. H02J 3/18 307/75 |
| 2018/0076622 | A1* | 3/2018 | Wilkins .............. H02J 3/1821 |
| 2018/0152131 | A1 | 5/2018 | Vidhi et al. |
| 2019/0245353 | A1 | 8/2019 | Varma et al. |

OTHER PUBLICATIONS

Sarkar et al., "Reactive Power Management in Renewable Rich Power Grids: A Review of Grid-Codes, Renewable Generators, Support Devices, Control Strategies and Optimization Algorithms," IEEE Access, pp. 41458-41489, vol. 6, 2018.

Varma et al., "Novel nighttime application of PV solar farms as STATCOM (PV-STATCOM)." In 2012 IEEE Power and Energy Society General Meeting, pp. 1-8. IEEE, 2012.

* cited by examiner

SYSTEMS AND METHODS FOR ENHANCED REACTIVE POWER MANAGEMENT IN A HYBRID ENVIRONMENT

BACKGROUND

The field of the present disclosure relates generally to managing reactive power and, more specifically, to managing reactive power in a hybrid power environment to improve active power generation.

Hybrid renewable power generation plants generally include a mixture of wind turbines and solar collectors. The power generation capabilities of these assets vary based on current operating conditions, such as wind speed and solar irradiation. Furthermore, these assets also provide the reactive power support for the plant to meet the required reactive power generation. However, reactive power generation reduces the amount of active or real power that an asset is producing. When the active power production is high, the capability for reactive power production may be limited by the apparent power capability of the generator and the inverters.

In a hybrid renewable plant, each generating asset is capable of producing some amount of power depending on system capability (such as name plate rating or grid interconnect capability), component capability (such as inverter rating or generator rating), environmental conditions (such as wind speed, direction, or solar irradiation) and operating state (such as state of charge of battery or temperature of power electronic switches). Accordingly, it would be useful to remove the limitation of active power generation limitation by wind generators or solar inverters owning to reactive power requirements while meeting the reactive power requirements at the point of grid interconnect by leveraging the synergies of co-located wind and solar generation assets.

This could in turn lead to scenarios where the real power production needs to be curtailed because of inadequate component capability to provide reactive power support. This curtailment of real power leads to energy spillage and loss. Also, under some curtailment scenarios, a plant is expected to produce less power than it is capable of producing at a particular time. The curtailment set point may be achieved by operating the plant to optimize power generation based on current conditions. Accordingly, it would be useful to combine forecasted conditions with asset generation capabilities to optimize plant energy production.

BRIEF DESCRIPTION

In one aspect, a system is provided. The system includes a computing device including at least one processor in communication with at least one memory device. The computing device is configured to be in communication with a plurality of power generating assets. The at least one processor is programmed to receive current conditions at the plurality of power generating assets. The plurality of power generating assets including a first asset type and a second asset type. The at least one processor is also programmed to determine a forecast for a period of time based at least in part on the current conditions. The at least one processor is further programmed to determine that a first asset of the first asset type of the plurality of power generating assets has an available uprate margin for production of a first amount of active power. In addition, the at least one processor is programmed to determine that a second asset of the second asset type of the plurality of power generating assets has capacity to generate a second amount of reactive power. Moreover, the at least one processor is programmed to instruct the first asset to reduce production of reactive power by the second amount and increase production of active power by the first amount. Furthermore, the at least one processor is programmed to instruct the second asset to increase production of reactive power by the second amount.

In another aspect, a method for operating a hybrid power generation plant including a plurality of power generating assets is provided. The method is implemented by a computing device including at least one processor in communication with at least one memory device. The method includes receiving current conditions at the plurality of power generating assets. The plurality of power generating assets including a first asset type and a second asset type. The method also includes determining a forecast for a period of time based at least in part on the current conditions. The method further includes determining that a first asset of the first asset type of the plurality of power generating assets has an available uprate margin for production of a first amount of active power. In addition, the method includes determining that a second asset of the second asset type of the plurality of power generating assets has capacity to generate a second amount of reactive power. Moreover, the method includes instructing the first asset to reduce production of reactive power by the second amount and increase production of active power by the first amount. Furthermore, the method includes instructing the second asset to increase production of reactive power by the second amount.

DETAILED DESCRIPTION

Figure 1:
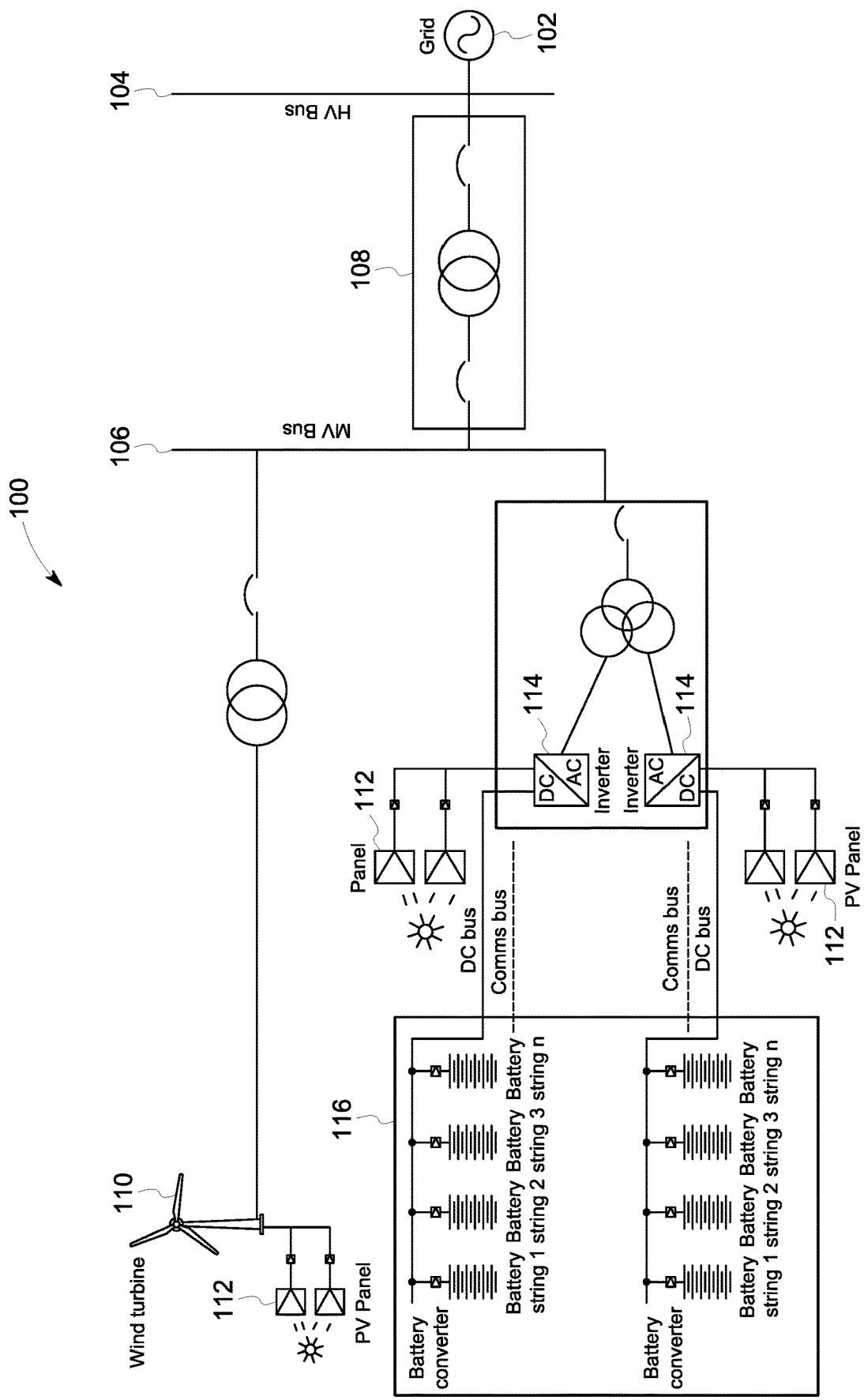
FIG. 1 illustrates a block diagram of an example hybrid renewable power generation plant in accordance with one embodiment of the present disclosure.

The implementations described herein relate to systems and methods for managing reactive power and, more specifically, to managing reactive power in a hybrid power environment to improve active power generation. More specifically, a power generation management computer device identifies current operating conditions, reallocates reactive power generation to assets with excess capacity based on the operating conditions?, and increases active power generation based on the reallocation.

Described herein are computer systems such as power generation management computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are examples only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are examples only, and thus are not intended to limit in any way the definition and/or meaning of the term database. Examples of an RDBMS include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In another embodiment, a computer program is provided, and the program is embodied on a computer-readable medium. In an exemplary embodiment, the system is executed on a single computer system, without requiring a connection to a server computer. In a further exemplary embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of an example hybrid renewable power generation plant 100 in accordance with one embodiment of the present disclosure. In the exemplary embodiment, plant 100 is connected to and provides power for a grid 102. The assets of plant 100 are connected to the grid 102 though a high voltage bus 104 and a medium voltage bus 106, which are connected via one or more transformers 108.

In the exemplary embodiment, plant 100 includes a plurality of wind assets 110 (e.g., wind turbines), and a plurality of solar assets 112 (e.g., photovoltaic panels, also known as solar panels). In plant 100, at least some solar assets 112 may be connected to inverters 114 to convert DC power to AC power. Furthermore, plant 100 may include one or more batteries 116 for storing extra power. While the present disclosure describes photovoltaic solar generation, other distributed power generation sources may be used with the systems and methods described herein.

During operation of plant 100, environmental conditions will change and affect the operations of wind assets 110 and solar assets 112. For example, a day may be cloudy and windy with low solar irradiance and high wind. Alternatively, a day may be sunny with high solar irradiance and little or no wind. Also at night, solar assets 112 and their associated inverters 114 may be unused due to the lack of solar irradiance. In other situations, the power generated by wind assets 110 and solar assets 112 may be greater than that required or allowed to be supplied to grid 102. In this situation, plant 100 may store at least a portion of the excess generated power in batteries 116.

The present disclosure provides methods for utilizing inverters 114 associated with solar assets 112 and batteries 116 as a source of reactive power generation based on need and current conditions. The methods described herein use the fact that inverters 114 associated with solar assets 112 are generally underutilized at night. Additionally, when solar assets 112 of plant 100 are not generating power up to their rated generation capacity, the systems and methods described herein may be applied. For approximately 60% of the daytime (e.g., 8 out of 13 hours of daylight), inverter 114 capacity is underutilized. This underutilized capacity may also be used at night. Thus the systems described herein disclose shifting reactive power generation from wind assets 110 to inverters 114 when inverters 114 are lightly loaded. This allows wind assets 110 to operate at a higher kilowatt (kW) level and generate additional active power without altering their mechanical operation or requiring additional hardware.

Figure 2:
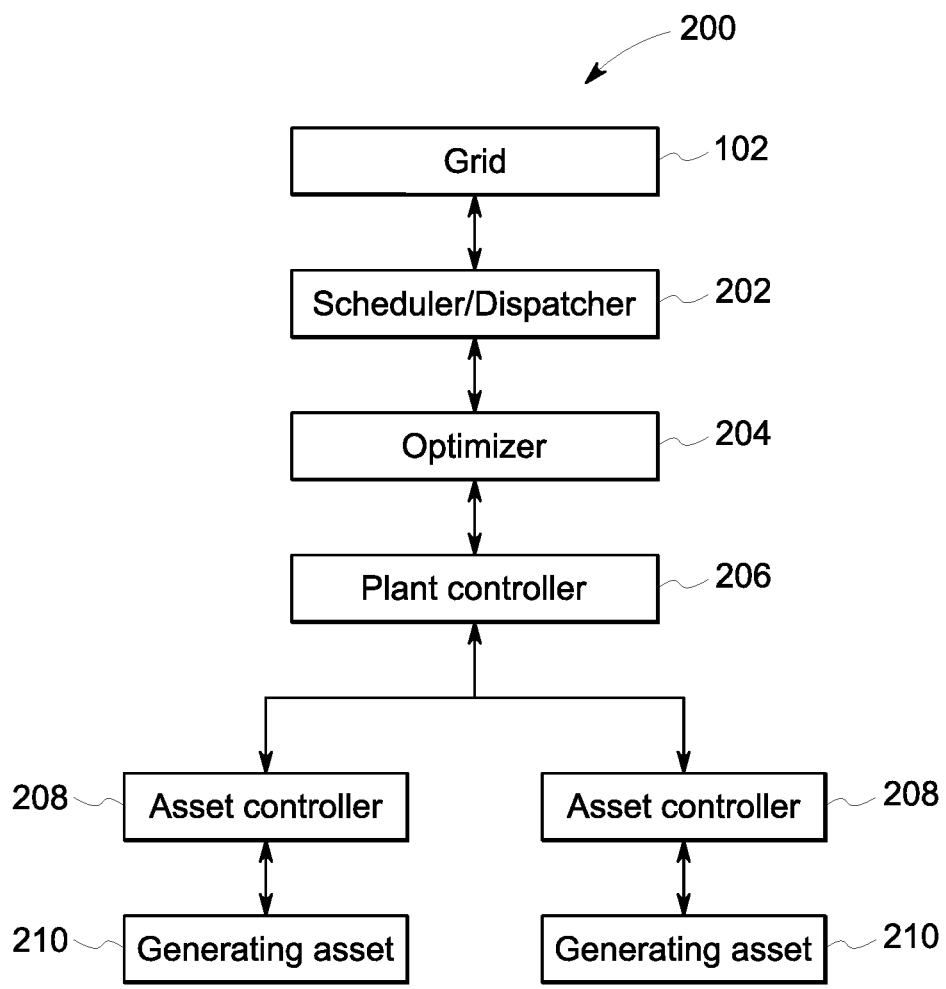
FIG. 2 illustrates a block diagram of an example hybrid plant architecture such as of the hybrid renewable power generation plant shown in FIG. 1.

FIG. 2 illustrates a block diagram of an example hybrid plant architecture 200 such as of the hybrid renewable power generation plant 100 (shown in FIG. 1). In the exemplary embodiment, architecture 200 includes a plurality of computer devices that coordinate the operation of plant 100.

In the exemplary embodiment, architecture 200 is in communication with grid 102 via a scheduler/dispatcher 202. Scheduler/dispatcher 202 communicates with grid 102 to determine current demand, demand forecasts, and other system requirements of grid 102. Scheduler/dispatcher 202 also communicates with an optimizer 204 that optimizes the operation and power generation of assets 210, such as wind assets 110 and solar assets 112 (both shown in FIG. 1), including balancing the active and reactive power generation. In a hybrid renewable plant 100, each asset 210 is capable of producing some amount of power depending on system capability (such as name plate rating or grid interconnect capability), component capability (such as inverter rating or generator rating), environmental conditions (such as wind speed, direction, or solar irradiation) and operating state (such as state of charge of battery or temperature of power electronic switches).

A plant controller 206 coordinates the operation of the various assets 210 of plant 100. Each asset 210 includes an asset controller 208 that controls the operation of individual asset 210. For example, if plant controller 206 instructs an asset 210 to produce 5 megawatts (MW) of power, asset controller 208 controls asset 210 to safely produce that amount of power. In some embodiments, asset controller 208 may also be in communication with one or more sensors that measure conditions at asset 210, including both environmental and operating conditions of asset 210. In some embodiments, a single asset controller 208 controls a plurality of assets 210. In other embodiments, each asset controller 208 controls a single asset 210. In some embodiments, plant controller 206 distributes the reactive power to asset controllers 208.

While scheduler/dispatcher 202, optimizer 204, and plant controller 206 are illustrated as separate devices, in some embodiments, they may be combined into a single computer device or other combination of computer devices. Furthermore, their functions may be shifted between various computer devices based on the configuration of architecture 200 for plant 100.

Figure 3:
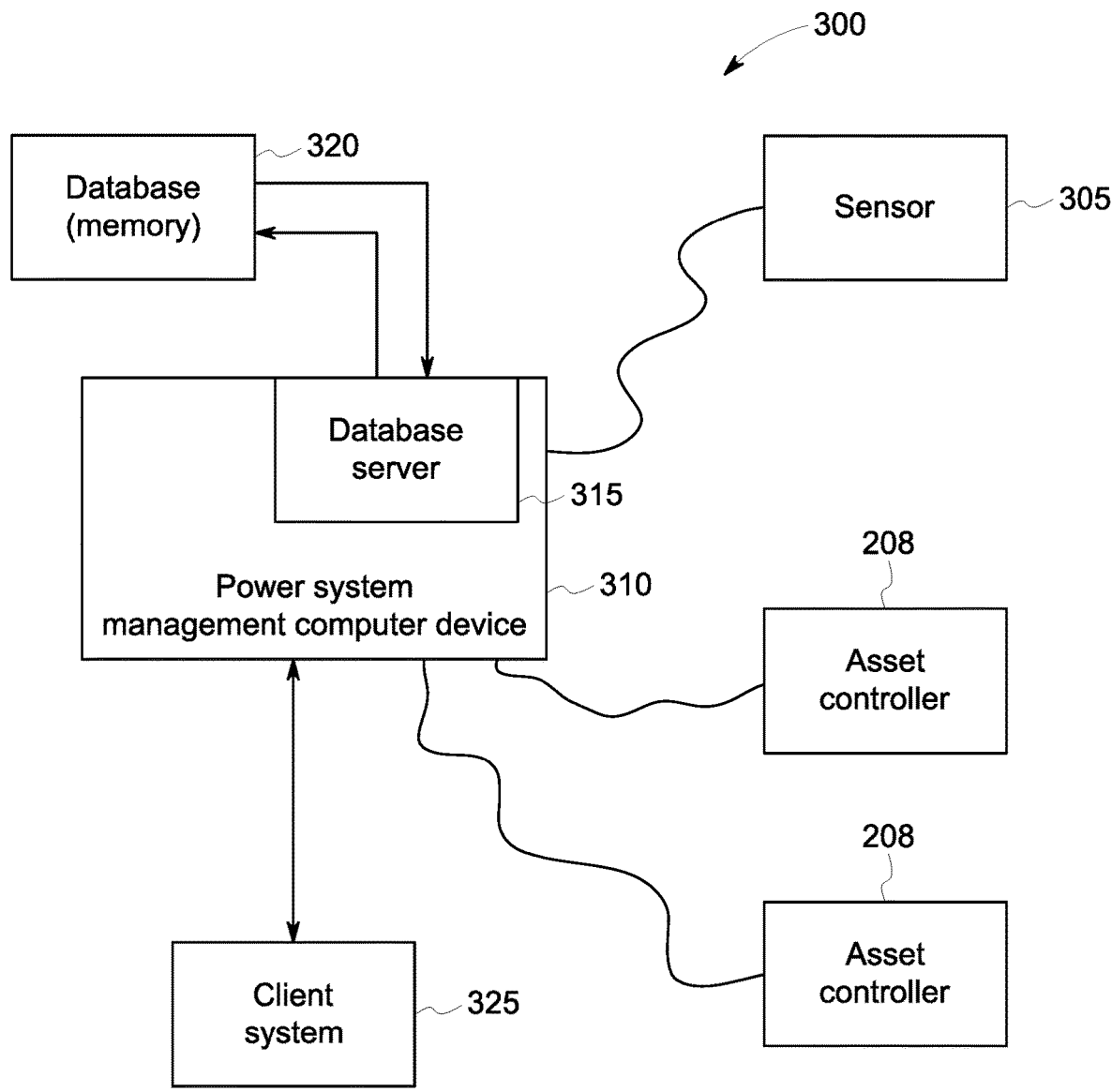
FIG. 3 is a simplified block diagram of an example system for managing reactive power in the hybrid renewable power generation plant shown in FIG. 1 using the hybrid plant architecture shown in FIG. 2.

FIG. 3 is a simplified block diagram of an example system 300 for managing reactive power in hybrid renewable power generation plant 100 (shown in FIG. 1) using hybrid system architecture 200 (shown in FIG. 2). In the example embodiment, system 300 analyzes current and future conditions to shift reactive power generation between assets to increase active power generation. In addition, system 300 includes a power system management computer device 310 (also known as a power system management server 310) configured to manage the reactive power generation. In the exemplary embodiment, power system management server 310 may be one or more of scheduler/dispatcher 202, optimizer 204, and plant controller 206. In some embodiments, these may be separate devices. In other embodiments, these may be the same device.

In system 300, sensors 305 observe an asset 210 (shown in FIG. 2) or current conditions. More specifically, sensors 305 measure a measured attribute of the observed asset or environment are in communication with power system management computer device 310. Sensors 305 connect to power system management computer device 310 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 305 receive data indicating conditions of an observed device or system, and report those conditions to power system management computer device 310. In other embodiments, sensors 305 are in communication with one or more client systems 325, such as, but not limited to asset controller 208 or client system 325, and client system 325 or asset controller 208 route the sensor data to power system management computer device 310. In some embodiments, sensor 305 measures one or more of temperature, vibration, revolutions of the blades, position (relative to the device being monitored or absolute), angular rotation of the blades, wind asset 110, or solar asset 112, humidity, light level, weather conditions, and other environmental conditions.

As described below in more detail, power system management server 310 is programmed to manage the production of reactive power to allow plant 100 to generate additional active power. Specifically, power system management server 310 is programmed to a) receive current conditions at the plurality of power generating assets, wherein the plurality of power generating assets include a first asset type and a second asset type; b) determine a forecast for a period of time based at least in part on the current conditions; c) determine that a first asset of the first asset type of the plurality of power generating assets has an available uprate margin for production of a first amount of active power; d) determine that a second asset of the second asset type of the plurality of power generating assets has capacity to generate a second amount of reactive power; e) instruct the first asset to reduce production of reactive power by the second amount and increase production of active power by the first amount; and f) instruct the second asset to increase production of reactive power by the second amount.

In the example embodiment, client systems 325 are computers that include a web browser or a software application, which enables client systems 325 to communicate with power system management server 310 using the Internet, a local area network (LAN), or a wide area network (WAN). In some embodiments, client systems 325 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 325 may be any device capable of accessing a network, such as the Internet, including, but not limited to, a desktop computer, a laptop computer, a personal digital assistant (PDA), a cellular phone, a smartphone, a tablet, a phablet, or other web-based connectable equipment.

As shown in FIG. 3, a database server 315 is communicatively coupled to a database 320 that stores data. In one embodiment, database 320 is a database that includes equations, forecasts, system capabilities, and requirements. In some embodiments, database 320 is stored remotely from power system management server 310. In some embodiments, database 320 is decentralized. In the example embodiment, a person can access database 320 via client systems 325 by logging onto power system management server 310.

Figure 4:
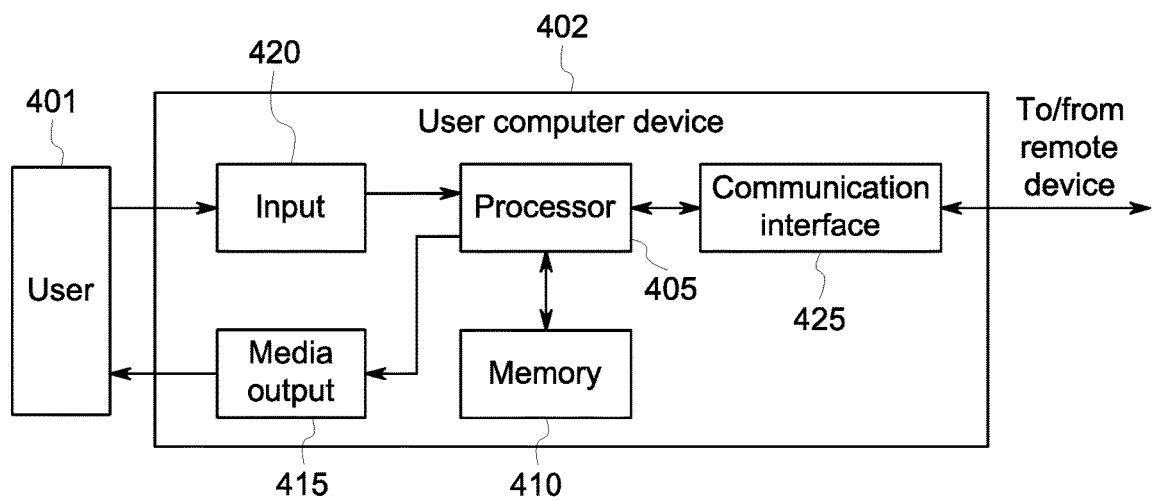
FIG. 4 illustrates an example configuration of the client computer device shown in FIG. 3, in accordance with one embodiment of the present disclosure.

FIG. 4 illustrates an example configuration of client system 325 shown in FIG. 3, in accordance with one embodiment of the present disclosure. A user computer device 402 is operated by a user 401. User computer device 402 may include, but is not limited to, asset controllers 208, sensors 305, and client systems 325 (all shown in FIG. 3). User computer device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or transaction data to be stored and retrieved. Memory area 410 may include one or more computer-readable media.

User computer device 402 also includes at least one media output component 415 for presenting information to user 401. Media output component 415 is any component capable of conveying information to user 401. In some embodiments, media output component 415 includes an output adapter (not shown) such as a video adapter and/or an audio adapter. An output adapter is operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401. A graphical user interface may include, for example, an interface for viewing the current or future conditions of plant 100 (shown in FIG. 1). In some embodiments, user computer device 402 includes an input device 420 for receiving input from user 401. User 401 may use input device 420 to, without limitation, select an asset 210 (shown in FIG. 2) to view the conditions of that asset 210. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as power system management server 310 (shown in FIG. 3). Communication interface 425 may include, for example, a wired or wireless network adapter and/or a wireless data transceiver for use with a mobile telecommunications network.

Stored in memory area 410 are, for example, computer-readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from power system management server 310. A client application allows user 401 to interact with, for example, power system management server 310. For example, instructions may be stored by a cloud service, and the output of the execution of the instructions sent to media output component 415.

Processor 405 executes computer-executable instructions for implementing aspects of the disclosure. In some embodiments, processor 405 is transformed into a special purpose microprocessor by executing computer-executable instructions or by otherwise being programmed.

Figure 5:
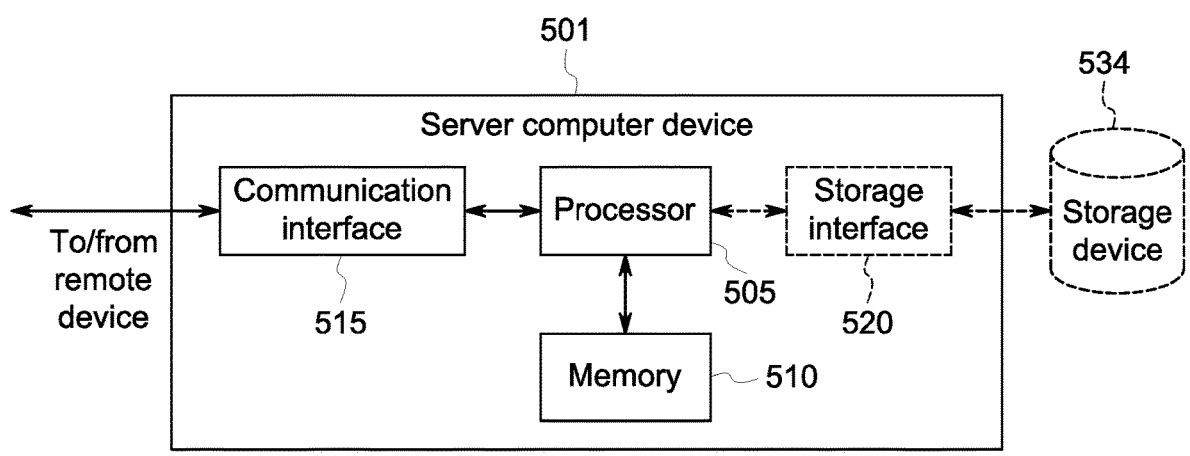
FIG. 5 illustrates an example configuration of the server system shown in FIG. 3, in accordance with one embodiment of the present disclosure.

FIG. 5 illustrates an example configuration of server system 310 shown in FIG. 3, in accordance with one embodiment of the present disclosure. A server computer device 501 may include, but is not limited to, scheduler/dispatcher 202, optimizer 204, plant controller 206 (all shown in FIG. 2), database server 315, and power system management server 310 (both shown in FIG. 3). Server computer device 501 also includes a processor 505 for executing instructions. Instructions may be stored in a memory area 510. Processor 505 may include one or more processing units (e.g., in a multi-core configuration).

Processor 505 is operatively coupled to a communication interface 515 such that server computer device 501 is capable of communicating with a remote device such as another server computer device 501, another power system management server 310, or client system 325 (shown in FIG. 3). For example, communication interface 515 may receive requests from client system 325 via the Internet, as illustrated in FIG. 3.

Processor 505 may also be operatively coupled to a storage device 534. Storage device 534 is any computer-operated hardware suitable for storing and/or retrieving data, such as, but not limited to, data associated with database 320 (shown in FIG. 3). In some embodiments, storage device 534 is integrated in server computer device 501. For example, server computer device 501 may include one or more hard disk drives as storage device 534. In other embodiments, storage device 534 is external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Figure 7:
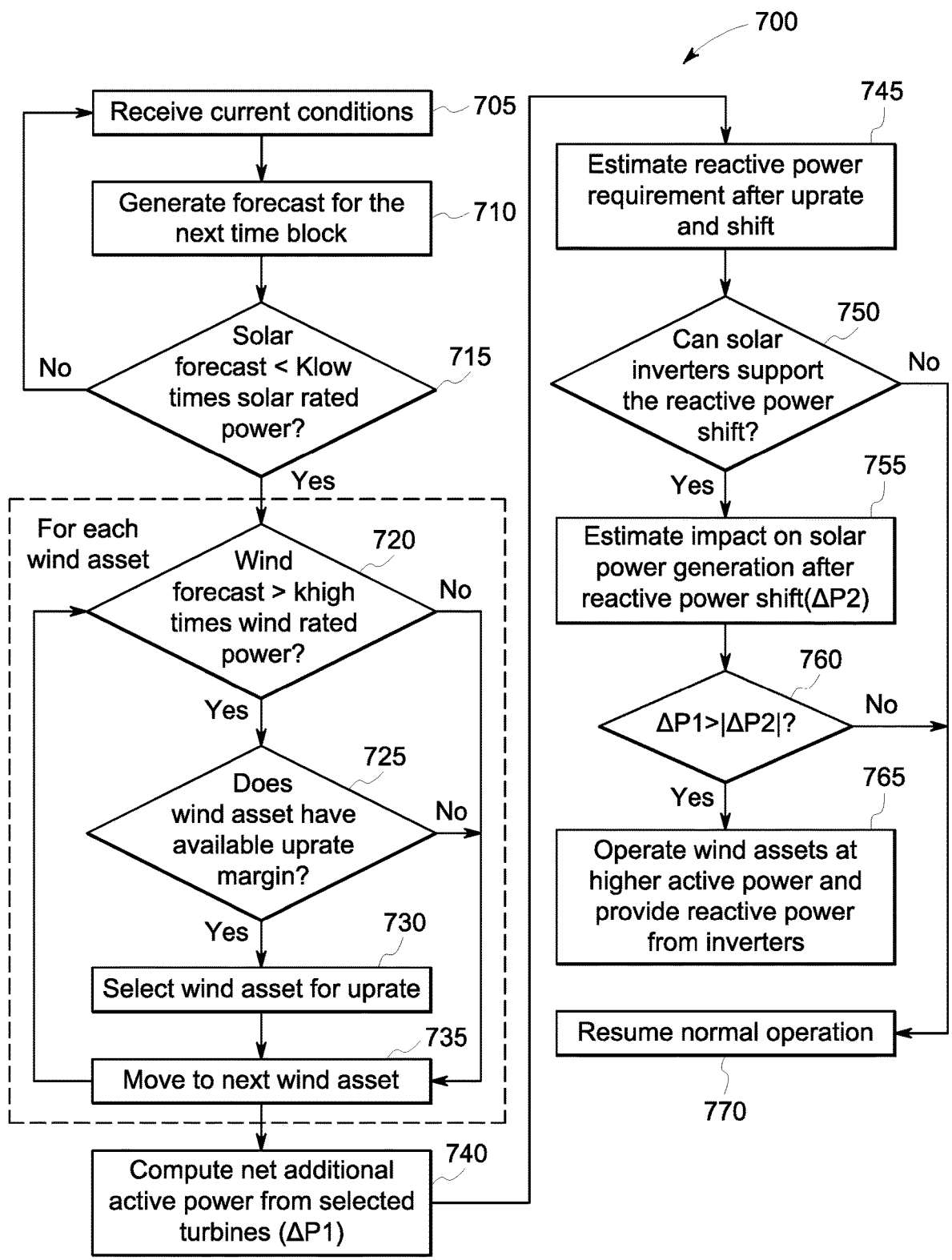
FIG. 7 illustrates a process for managing reactive power generation in the hybrid renewable power generation plant shown in FIG. 1.
Figure 8:
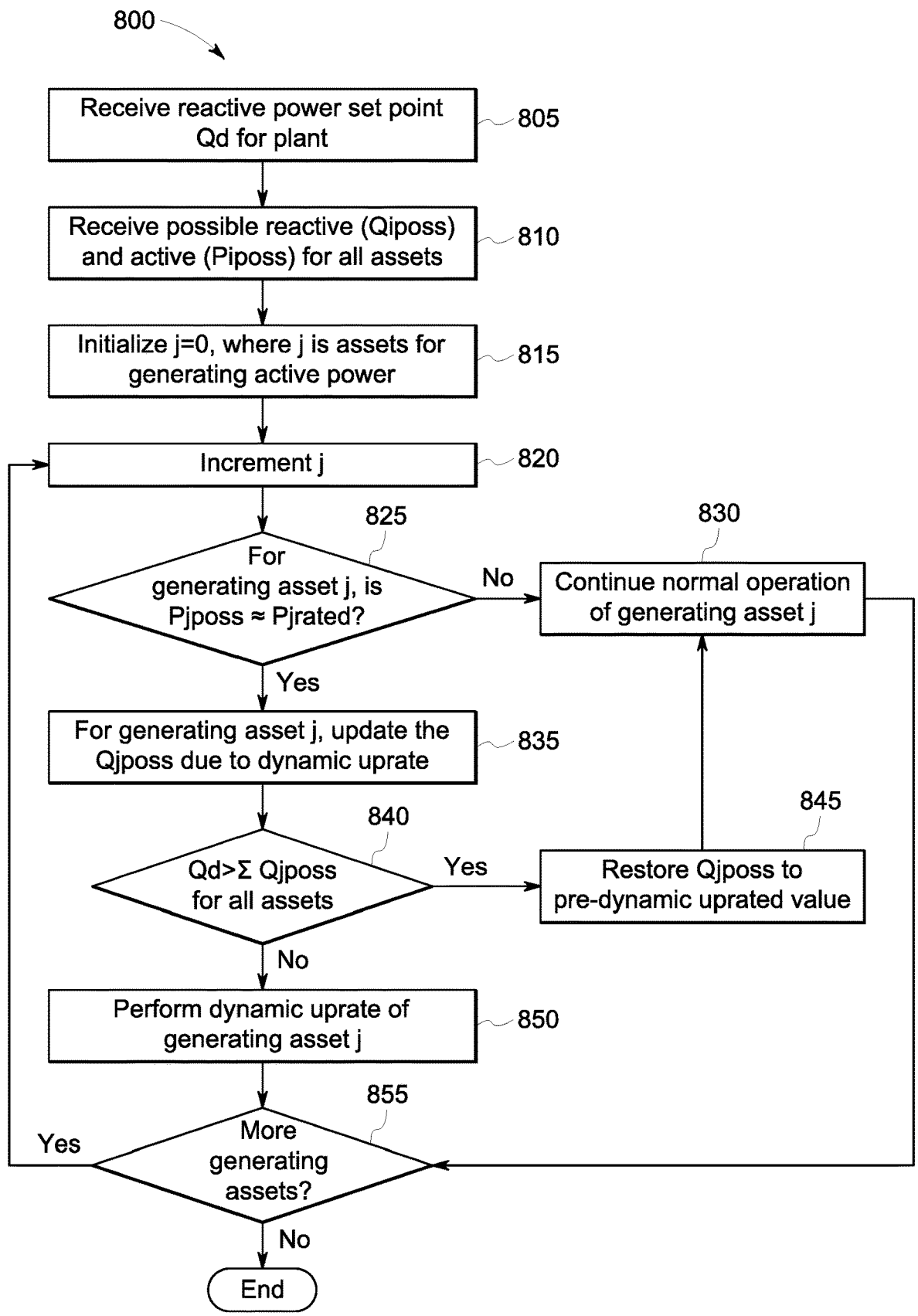
FIG. 8 illustrates another process for managing reactive power generation in the hybrid renewable power generation plant shown in FIG. 1.
Figure 9:
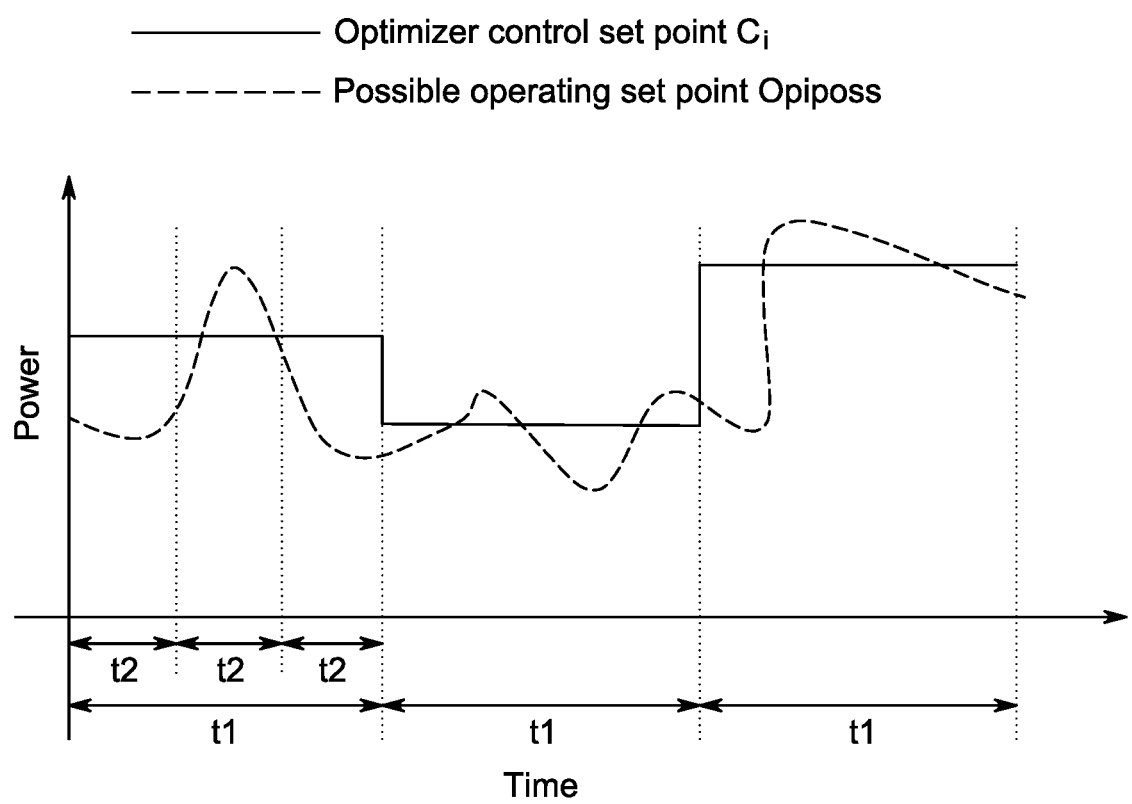
FIG. 9 illustrates a graph comparing control set points to possible operating set points for a variety of conditions.

Processor 505 executes computer-executable instructions for implementing aspects of the disclosure. In some embodiments, processor 505 is transformed into a special purpose microprocessor by executing computer-executable instructions or by otherwise being programmed. For example, processor 505 is programmed with instructions such as illustrated in FIGS. 7-9.

FIGS. 6A-6D illustrate apparent power capability curves including active and reactive power. FIGS. 6A-6D display active power (P) on the x-axis and reactive power (Q) on the y-axis. The Figures also show the apparent power curve, which illustrates the trade-off between active power and reactive power as shown in Equation 1 below.

$$Q = \sqrt{S^2 - P^2} \quad \text{EQ. 1}$$

where S is the apparent power.

Figure 6A:
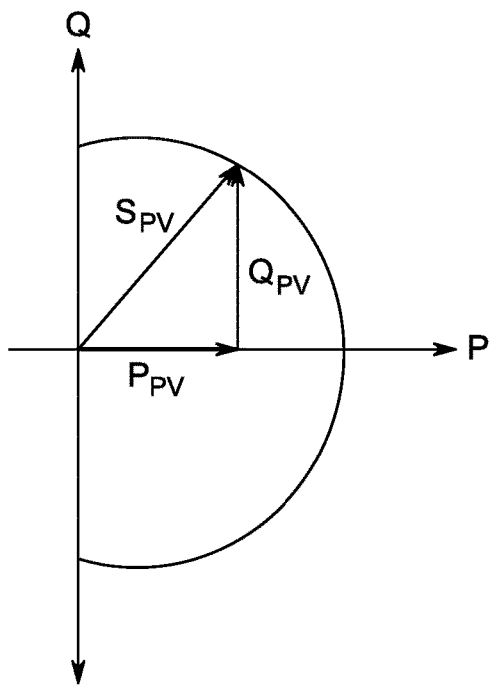
FIGS. 6A-6D illustrate apparent power capability curves including active and reactive power.
Figure 6B:
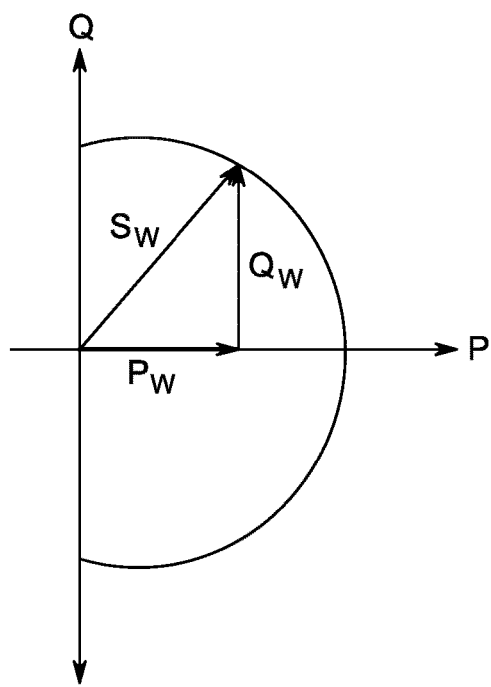
Figure 6C:
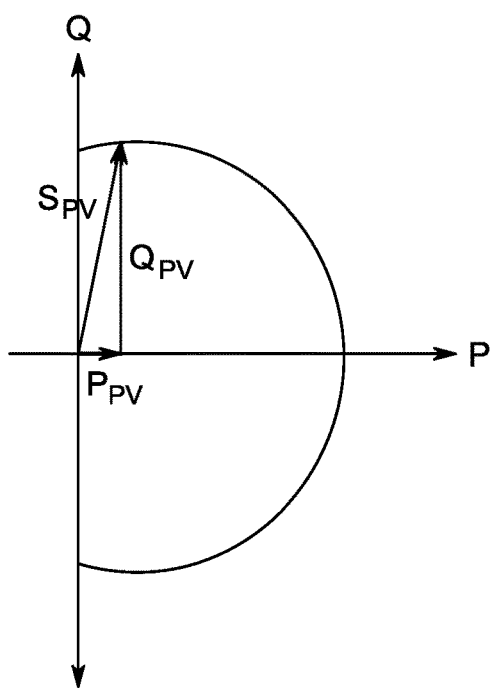
Figure 6D:
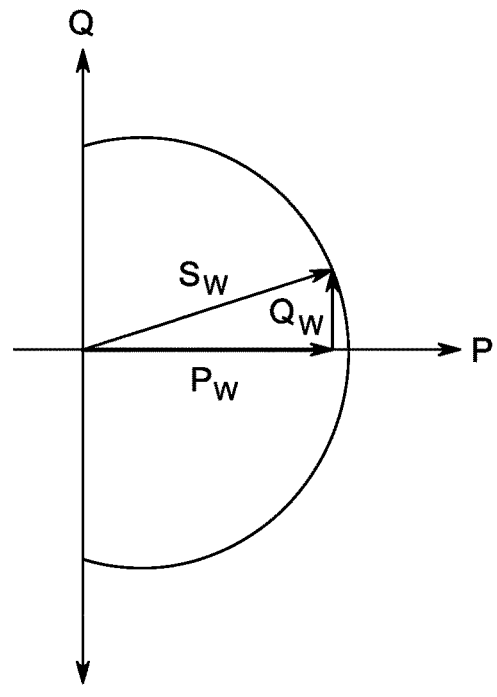

FIG. 6A illustrates the apparent power capability of an exemplary solar inverter 114 (shown in FIG. 1). FIG. 6B illustrates the apparent power capability of an exemplary wind asset 110 (shown in FIG. 1). FIG. 6C illustrates solar inverter 114 under low solar conditions. FIG. 6D illustrates wind asset 110 under high wind conditions.

As seen when comparing FIGS. 6A and 6C, as the reactive power generated increases, there is a corresponding decrease in the active power generation. The comparison of FIGS. 6B and 6D illustrates that there when active power increases, there is a corresponding decrease in reactive power generated.

FIG. 7 illustrates a process 700 for managing reactive power generation in hybrid renewable power generation plant 100 (shown in FIG. 1). In the exemplary embodiment, the steps of process 700 are performed by one or more of scheduler/dispatcher 202, optimizer 204, plant controller 206 (shown in FIG. 2), and power system management computer device 310 (shown in FIG. 3).

In the exemplary embodiment, power system management computer device 310 performs process 700 to shift reactive power generation from wind assets 110 to solar assets 112 and solar inverters 114 (all shown in FIG. 1) during the occurrence of low solar irradiance and high wind. The electrical margin available to wind assets 110 is leveraged to generate more active power. The active power of solar inverter 114 is reduced as a function of the power factor, as shown in Equation 1.

In the exemplary embodiment, power system management computer device 310 receives 705 current conditions, such as current wind speed and current solar irradiation levels. In some embodiments, power system management computer device 310 receives 705 the current conditions from one or more sensors 305 (shown in FIG. 3). In some embodiments, the current conditions include a forecast of future conditions for a period of time, such as, an hour, day, week, or other period of time.

In the exemplary embodiment, power system management computer device 310 stores or accesses, such as through database 320 (shown in FIG. 3), other system information about plant 100 and assets 210 (shown in FIG. 2). This other system information may include, but is not limited to, rated wind speed for wind assets 110 (shown in FIG. 1), rated solar irradiation for solar assets 112 (shown in FIG. 1), a point of interconnect limit for transformer 108 (shown in FIG. 1), and an MVA rating of one or more assets 210. In the exemplary embodiment, power system management computer device 310 also access thresholds for Khigh for wind assets 110 and Klow for solar assets 112, as described below. These thresholds may be set by a user through a client system 325 (shown in FIG. 3) or be preprogrammed based on historical data. In the exemplary embodiment, process 700 is performed when the amount of solar power that would be generated is below a certain level (Klow) and the amount of wind power that would be generated is greater than a certain level (Khigh). For example, Klow may be set between 40% and 60% of the total power potentially generated based on the asset's rating, while Khigh is set between 75% and 100% of the total power potentially generated based on the asset's rating. In some embodiments, process 700 may be performed during nighttime, evenings, and cloudy days to increase the amount of power generated.

In the exemplary embodiment, power system management computer device 310 generates 710 a forecast for the next time block for wind generation and solar generation. In the exemplary embodiment, the time block for wind may be between five and fifteen minutes while the time block for solar may be an hour. These time blocks may be dynamic and change as conditions change. The size of the time blocks may be based on plant 100 itself or the types of assets 210 used in process 700.

In the exemplary embodiment, power system management computer device 310 determines 715 if the generated solar forecast is greater than Klow multiplied by the solar rated power. This determination compares the generated solar forecast to the minimum threshold amount of solar power that would be generated in the time block. If the solar forecast is below the threshold, then process 700 continues. Otherwise process 700 returns to cycle through steps 705 through 715 until conditions change. In some embodiments, process 700 may cycle through steps 705 through 715 continuously. In other embodiments, power system management computer device 310 may only activate process 700 at specific times, such as specific times of day.

In the exemplary embodiment, power system management computer device 310 performs steps 720 through 735 for every wind asset 110 in plant 100. In other embodiments, power system management computer device 310 only performs steps 720 through 735 on a predetermined subset of wind assets 110. The power system management computer device 310 compares 720 the wind forecast to the Khigh threshold multiplied by the wind rated power of wind asset 110. If the forecast is greater, then power system management computer device 310 determines 725 if wind asset 110 has available margin for uprate (uprate margin) and is not currently under deration or curtailment. The available margin for uprate indicates if the available power generation of active power of that wind asset 110 may be increased. For example, assume a wind asset 110 is rated for (e.g., has a nameplate listing of) 3.98 MW. However, if the reactive power generation is adjusted, then the amount of active power that wind asset 110 generates could be increased to 4.2 MW. In this case, the uprate margin is 0.22 MW. This uprate is only the energy uprate and does not affect the mechanical operation of wind asset 110. Each wind asset 110 that is able to be uprated is selected 730 for uprate, and the next wind asset 110 is reviewed 735. In some embodiments, a wind asset 110 may not be available for uprate because it is not in the high wind region, and thus not able to produce additional active power. In some embodiments, each wind asset 110 is individually compared to the threshold to determine if that wind asset 110 is available for uprate.

Power system management computer device 310 computes 740 the net additional active power that can be generated from select wind assets 110 as ΔP1. Further, power system management computer device 310 estimates 745 the reactive power requirement corresponding to the net plant active power generation after the uprate that may be shifted from wind assets 110 to solar assets 112. In addition, power system management computer device 310 determines 750 if inverters 114 (shown in FIG. 1) may support the power shift. If not, then process 700 ends and normal operation 770 of plant 100 continues. Otherwise, power system management computer device 310 estimates 755 the impact on the solar power generation due to the supply of reactive power as ΔP2, which includes the losses from moving generation from active to reactive power. Power system management computer device 310 determines 760 if the amount of active power gained is greater than the amount of active power that will be lost due to the shift (ΔP1>|ΔP2|). If not, then process 700 ends and normal operation 770 of plant 100 continues. Otherwise, power system management computer device 310 operates 765 wind assets 110 at the higher MW values and use solar inverters 114 to provide the reactive power.

In some other embodiments, power system management computer device 310 calculates ΔP2 after step 715. In these embodiments, power system management computer device 310 cycles through steps 720 through 735 for each wind asset 110 until capacity is reached and then only those selected wind assets 110 are uprated. This allows power system management computer device 310 to use all available capacity. For example, if ΔP2 is 4 MW and each wind asset 100 provides 0.5 MW uprate value, then power system management computer device 310 may select eight wind assets 110 to uprate. In some further embodiments, if power system management computer device 310 determines 750 that inverters 114 will support the power shift, power system management computer device 310 determines how much of a shift inverters 114 can support and reselects 730 available wind assets 110 for uprate to meet that amount.

In some embodiments, process 700 may be performed dynamically as conditions change. Process 700 may also be performed on a planned basis, such as through the use of forecasts.

In some further embodiments, process 700 accounts for the electrical layout of plant 100 in the calculations (e.g., by taking into account distances between assets 210). In still further embodiments, process 700 also accounts for auxiliary losses, such as those from inverters 114 consuming power whether or not associated solar assets 112 are generating power.

While process 700 is described from the point of view of using solar assets 112 to generate reactive power for wind assets 110, in other embodiments, process 700 may be reversed so that wind assets 110 are generating reactive power for solar assets 112. Furthermore, inverters 114 may also be used with batteries 116 to generate the reactive power as described herein, such as in situations where solar assets 112 are unable to generate reactive power.

Two examples of the gains that may be seen with shifting reactive power are demonstrated in Table 1 below. For the purposes of these examples, Site A has 23 gigawatt hours (GWh) of wind and 24 GWh of solar, while Site B has 160 GWh of wind and 146 GWh of solar.

TABLE 1

| Site | Scenario | Wind > x | Solar < x | Opportunity | ΔSolar | ΔWind | Net |
|------|----------|----------|-----------|-------------|--------|-------|-----|
| A | Wind > 95% Solar < 50% | 1003 h 5.4 GWh | 6702 h | 743 h | −0.08 GWh −0.32% of 24 GWh | +0.40 GWh +1.74% of 23 GWh | +0.33 GWh +0.7% of 47 GWh |
| B | Wind > 95% Solar < 50% | 665 h 33.7 GWh | 6738 h | 559 h | −0.24 GWh −0.17% of 146 GWh | +2.83 GWh +1.77% of 160 GWh | +2.59 GWh +0.85% of 306 GWh |

As shown above in Table 1, in the example sites, process 700 may be used for a net improvement in operation of corresponding plants 100. Furthermore, process 700 may be used to design high efficiency hybrid plants 100 based on a mix of solar, wind, and potentially battery or other sources.

FIG. 8 illustrates another process 800 for managing reactive power generation in hybrid renewable power generation plant 100 (shown in FIG. 1). In the exemplary embodiment, the steps of process 800 are performed by one or more of scheduler/dispatcher 202, optimizer 204, plant controller 206 (shown in FIG. 2), and power system management computer device 310 (shown in FIG. 3).

In the exemplary embodiment, process 800 may be used to achieve reactive power requirements of plant 100 by distributing the reactive power commands to individual generation assets 210 (shown in FIG. 2) based on possible power and operating conditions to achieve desired objectives. Example objectives include, but are not limited to, using under-utilized wind generator 110 capability and inverter 114 (both shown in FIG. 1) of wind and solar for reactive power support. These objectives may be achieved by using wind assets 110 to support the reactive power requirement of plant 100 during periods of low wind and high solar conditions. These objectives may also be achieved during periods of high wind and low solar conditions by a) using solar inverter 114 to supply reactive power of plant 100; and b) when solar inverters 114 may supply reactive power of plant 100, dynamically uprating wind assets 110 to produce more active or real power. This may result in an improvement in the annual energy production of hybrid plant 100.

However, when solar inverters 114 supply the reactive power at night, the collector system losses, such as cable losses, in the system may increase. Therefore, there is a trade-off between the increase in annual energy production and the increase in the collector or parasitic losses. These collector losses can be achieved in one or more of the following ways: a) optimizing the reactive power generation from the entire system to minimize loss based network configuration; b) using network information (layout) to ensure that generation asset 210 farthest from the substation contributes the least amount of reactive power; c) distributing the reactive power in the ratio of current flowing through the asset; and d) distributing the reactive power in the inverse ratio of impedance between the collector system substation and the asset.

In the exemplary embodiment, power system management computer device 310 receives 805 a reactive power set point (Qd) for plant 100. In the exemplary embodiment, Qd is based on one or more requirements from grid 102 (shown in FIG. 1). Power system management computer device 310 also receives 810 possible reactive power (Qiposs) and possible active power (Piposs) values for all individual generating assets 210. In some embodiments, power system management computer device 310 receives 810 the Qiposs and Piposs values from associated asset controllers 208 (shown in FIG. 2). In these embodiments, the Qiposs and Piposs values may be based on current conditions, such as those provided by sensors 305 (shown in FIG. 3). In other embodiments, the Qiposs and Piposs values are stored in database 320 (shown in FIG. 3).

In the exemplary embodiment, the individual generating assets 210 include wind assets 110 and solar assets 112. For the purposes of this discussion, wind assets 110 will contribute active power while solar assets 112 will contribute reactive power, such as during high wind and low solar conditions. However, process 800 may also be performed in periods of low wind and high solar, where solar assets 112 provide active power and wind assets 110 provide the reactive power. In other embodiments, both wind assets 110 and solar assets 112 generate active power, while batteries 116 generate the reactive power.

For each active power generating asset 210, power system management computer device 310 cycles through steps 820 through 855. In the exemplary embodiment, power system management computer device 310 initializes 815 $j$ to zero, where j represents current active power generating asset 210. Power system management computer device 310 subsequently increments 820 $j$.

For asset j 210, power system management computer device 310 determines 825 if the possible active power (Pjposs) for that asset 210 is approximately equal to the amount of the active power that asset 210 is rated for. If not, then power system management computer device 310 continues 830 normal operation of that generating asset 210 and proceeds to next generating asset 210. If the possible active power (Pjposs) for that asset 210 is approximately equal to the amount of the active power that asset 210 is rated for, power system management computer device 310 updates 835 the possible reactive power (Qjposs) for that asset 210 based on uprating the active power of asset 210. Power system management computer device 310 compares 840 the reactive power set point (Qd) to the sum of all of the Qjposs for all of assets 210. If the reactive power set point (Qd) is greater than the sum of all available possible reactive power, then power system management computer device 310 restores 845 the Qjposs for asset j 210 to its pre-dynamic uprate value and continues 830 normal operation of that asset 210. Otherwise, power system management computer device 310 performs 850 the dynamic uprate of generating asset j 210.

Power system management computer device 310 determines 855 if there are more assets 210 to analyze and returns to step 820 if there are. Otherwise, process 800 ends.

FIG. 9 illustrates a graph comparing control set points to possible operating set points for a variety of conditions. In the exemplary embodiment, optimizer 204 (shown in FIG. 2) sets control set point (Ci) for plant 100 (shown in FIG. 1) every time period t1. However, the possible operating set point (Opiposs) may change more rapidly than the control set point is updated. The Opiposs may be based on current conditions and calculated by asset controllers 208 (shown in FIG. 2).

As shown in FIG. 9, there are times where the control set point can not be met by the available power in plant 100. Furthermore, there are times where the available power is greater than the control set point. In these situations, plant 100 curtails the power transmitted to grid 102 (shown in FIG. 1). For example, in a curtailment situation, the point of interconnect between plant 100 and grid 102 may be set to 12 MW. Plant 100 may include wind assets 110 (shown in FIG. 1) that may produce up to 10 MW and solar assets 112 (shown in FIG. 1) that may produce up to 5 MW. This combination of 15 MW exceeds the 12 MW limit. Accordingly, plant 100 is curtailed to produce 12 MW. In some embodiments, when plant 100 is producing in excess of 12 MW, the excess is stored in batteries 116 (shown in FIG. 1).

Figure 10:
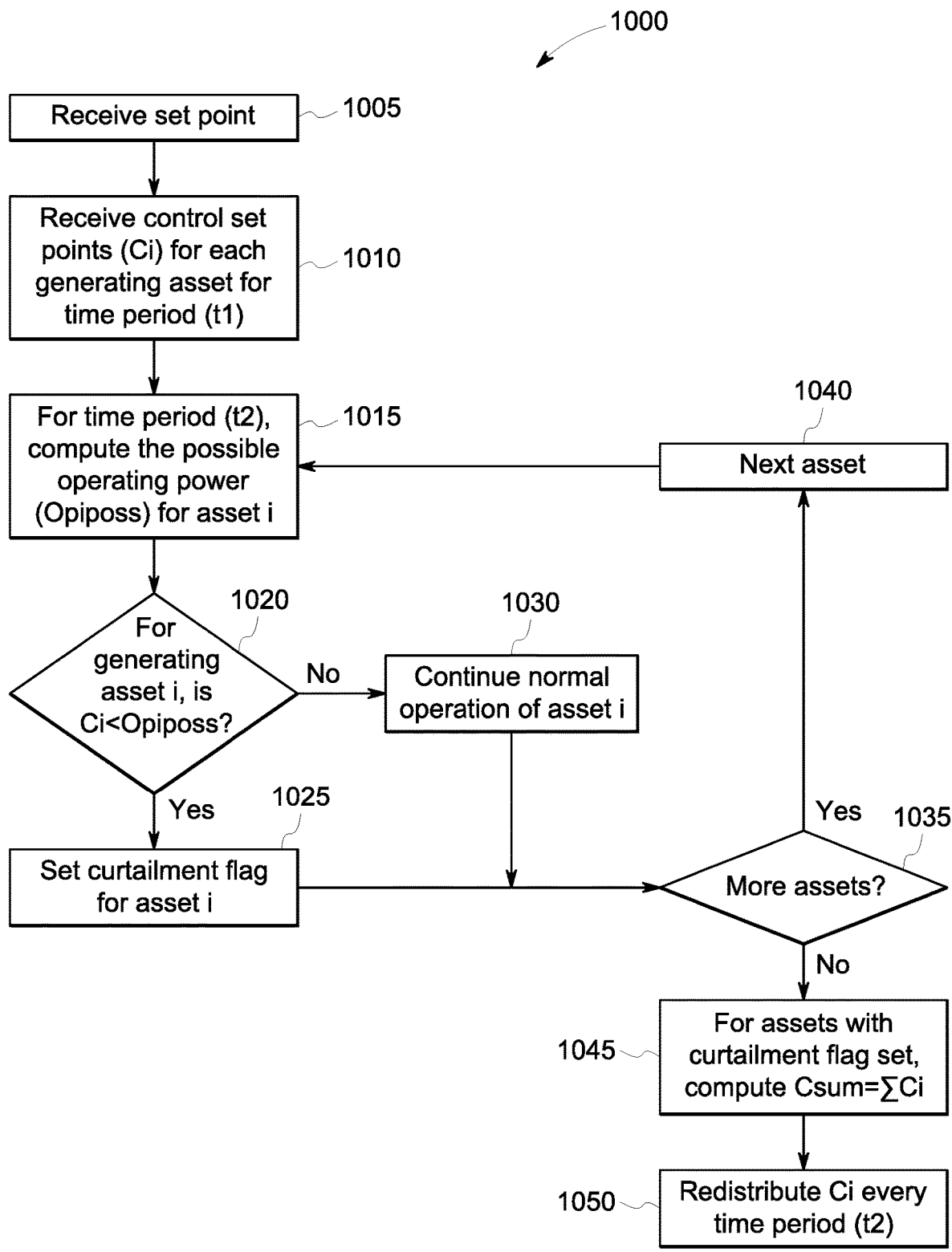
FIG. 10 illustrates a process for managing curtailment in the hybrid renewable power generation plant shown in FIG. 1.

FIG. 10 illustrates a process 1000 for managing curtailment in hybrid renewable power generation plant 100 (shown in FIG. 1). In the exemplary embodiment, the steps of process 1000 are performed by one or more of scheduler/dispatcher 202, optimizer 204, plant controller 206 (shown in FIG. 2), and power system management computer device 310 (shown in FIG. 3).

Under curtailment scenarios, plant 100 is expected to produce less power than it is capable of producing at a particular time. The curtailment set point can be achieved by operating plant 100 in multiple ways. Process 1000 describes redistribution of the set points of the curtailed assets not only based on curtailment requirements of plant 100, but also based on utilizing the capability of each generating asset 210 (shown in FIG. 2) to meet certain objectives.

These objectives may include, but are not limited to, (a) maximization of revenue generated during curtailment scenarios in a hybrid renewable plant 100, such as if there is differential tariff for the different types of generating assets 210 or a subsidy for power from different types of generating assets 210; (b) minimization of the losses in the collector system; and (c) minimization of negative impact on life of components impacted due to curtailment. Some components may be negatively impacted by curtailment. For example, if a wind turbine 110 (shown in FIG. 1) is capable of producing 10 MW under current conditions, but is curtailed to produce 7 MW, asset controller 208 (shown in FIG. 2) for that wind turbine 110 causes the blades of the wind turbine to change in pitch, so that less wind is caught by the blades and thus less power is generated. This behavior increases wear on the blades and reduces the life of the blades. Another example includes repeated cycling of batteries 116 (shown in FIG. 1), which may reduce their life and/or efficiency.

In some embodiments, the power producing capability of renewable generation assets 210 could vary at a faster rate than the change in the curtailment set point. Hence, the redistribution of the set point to curtailed assets 210 to meet the above stated objectives happens at a faster rate than the change in curtailment set point. Therefore, process 1000 addresses this situation.

In the exemplary embodiment, power system management computer device 310 receives 1005 the set point. In some embodiments, the set point is received 1005 from scheduler/dispatcher 202 (shown in FIG. 2). In other embodiments, the set point is received 1005 from grid 102 (shown in FIG. 1).

Power system management computer device 310 receives 1010 control set points (Ci) for each generating assets 210 for time period t1. In some embodiment, time period t1 is any time period that the control set point (Ci) is valid for. This may range from 30 seconds to 10 minutes, for example, depending on the operating conditions and the configuration of plant 100. In the exemplary embodiment, the control set points ($C_i$) are received from optimizer 204. The control set points represent the amount of energy each individual generating asset 210 is to produce during time period t1.

For each generating asset 210, power system management computer device 310 performs steps 1015 through 1040. For generating asset i 210, power system management computer device 310 computes 1015 the possible operating power (Opiposs) for that asset 210 for time period t2, where t2<t1. Power system management computer device 310 may use information from asset controller 208, such as the current operating conditions, as well as the system capability, component capability, and operating state to compute 1015 the possible operating power. Power system management computer device 310 determines 1020 if the control set point for asset i 210 is less than the possible operating power. If so, then power system management computer device 310 sets 1025 the curtailment flag for asset i 210. Otherwise, power system management computer device 310 continues 1030 normal operation of asset i. Either way, power system management computer device 310 determines 1035 if there are more assets 210 to analyze. If so, then power system management computer device 310 continues 1040 to next asset 210. Otherwise, power system management computer device 310 computes 1045 the sum of the curtailed control set points by summing together all of assets 210 with the curtailment flag set. Power system management computer device 310 redistributes 1050 the control set points for time period t2 based on the above objectives, subject to the constraints that $\Sigma C_i = C_{sum}$ and $C_i \leq Opiposs$.

For example, process 1000 may determine that wind assets 110 A, C, and D are subject to curtailment and the sum of the control set points for these assets 110 are 15 MW; however, each is only producing 3 MW due to curtailment. Power system management computer device 310 may determine that there is a tariff on solar power and decide to end the curtailment on these three assets and lower the set points on solar assets 112 instead to allow these three assets 110 to operate at higher levels and improve the revenue for plant 100. Power system management computer device 310 may also determine that the curtailment of three wind assets 110 will have a negative impact on the life of those components and redistribute 1050 the set points to end the curtailment on those assets 110.

At least one of the technical solutions provided by this system to address technical problems may include: (i) improved design of plants to maximize output; (ii) increased utilization of installed electrical components such as wind generators and inverters; (iii) increased annual energy production of the plant due to dynamic uprate of wind assets; (iv) reduction in collector system losses due to optimal distribution of reactive power among generation assets; (v) reduction in spill-over of energy during curtailment scenarios in a hybrid renewable plant; (vi) maximization of revenue generated during curtailment scenarios in a hybrid renewable plant; and (vii) minimization of negative impact on life of components impacted due to curtailment.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about infrastructures and users associated with a building to detect events and correlations between detected events to identify trends.

Based upon these analyses, the processing element may learn how to identify characteristics and patterns that may then be applied to analyzing image data, model data, and/or other data. For example, the processing element may learn, with the user's permission or affirmative consent, to identify the type of building events that occurred based upon collected images of building. The processing element may also learn how to identify building trends that may not be readily apparent based upon collected sensor data.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for analyzing data to predict events. The system and methods described herein address that technical problem. Additionally, at least one of the technical solutions provided by this system to overcome technical problems may include: (i) improved design of plants to maximize output; (ii) increased utilization of installed electrical components such as wind generators and inverters; (iii) increased annual energy production of the plant due to dynamic uprate of wind assets; (iv) reduction in collector system losses due to optimal distribution of reactive power among generation assets; (v) reduction in spill-over of energy during curtailment scenarios in a hybrid renewable plant; (vi) maximization of revenue generated during curtailment scenarios in a hybrid renewable plant; and (vii) minimization of negative impact on life of components impacted due to curtailment.

The methods and systems described herein may be implemented using computer programming or engineering techniques including computer software, firmware, hardware, or any combination or subset thereof, wherein the technical effects may be achieved by performing at least one of the following steps: (a) receive current conditions at the plurality of power generating assets, wherein the plurality of power generating assets including a first asset type and a second asset type; (b) determine a forecast for a period of time based at least in part on the current conditions; (c) determine that a first asset of the first asset type of the plurality of power generating assets has an available uprate margin for production of a first amount of active power; (d) determine that a second asset of the second asset type of the plurality of power generating assets has capacity to generate a second amount of reactive power, wherein the second amount is an amount of reactive power production reduced by increasing the active power production of the first asset by the first amount, wherein the second asset reduces production of active power by a third amount, and wherein the third amount is less than the first amount, wherein the first asset is a wind asset and wherein the second asset is one of a solar asset inverter and a battery inverter; (e) instruct the first asset to reduce production of reactive power by the second amount and increase production of active power by the first amount; (f) instruct the second asset to increase production of reactive power by the second amount; (g) determine a first forecast for production of power by assets of the first asset type during the period of time; (h) determine a second forecast for production of power by assets of the second asset type during the period of time; (i) store a first production threshold associated with the first asset type and a second production threshold associated with the second asset type; (j) compare the second production threshold to the second forecast to determine if the second forecast is below the second production threshold; (k) compare the first production threshold to the first forecast for the first asset to determine if the first forecast is above the first production threshold; (l) determine that a first plurality of assets of the first asset type of the plurality of power generating assets have available uprate margin for production of a first total amount of additional active power; (m) determine that a second plurality of assets of the second asset type of the plurality of power generating assets have capacity to generate a second total amount of reactive power, wherein the second total amount of reactive power is based on a reduction in production of reactive power by the first plurality of assets generating the first total amount of additional active power; (n) receive a reactive power set point for the plurality of power generating assets; (o) determine possible reactive power generation and possible active power generation for each asset of the plurality of power generating assets; (p) compare the possible active power generation for each asset of the plurality of power generating assets to a production rating for the corresponding asset; (q) if the possible active power generation for the asset corresponds to the production rating, uprate the production of active power for the corresponding asset; (r) update the possible reactive power generation for the corresponding asset based on the uprate; (t) perform the uprate of the corresponding asset if the reactive power set point exceeds a sum of the possible reactive power generation for all assets of the plurality of power generating assets; (u) determine if one or more assets of the plurality of power generating assets are operating under curtailment; (v) readjust one or more operating set points of the one or more assets based on the curtailment; (w) readjust operating set points associated with the plurality of power generating assets based on the curtailment; and (x) readjust the operating set points based on one or more of maximizing revenue from the plurality of power generating assets, reducing collector system losses, and minimizing impact on life of components.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a computing device comprising at least one processor in communication with at least one memory device, wherein said computing device is configured to be in communication with a plurality of power generating assets, wherein said at least one processor is programmed to:
receive current weather conditions at the plurality of power generating assets, wherein the plurality of power generating assets including a first asset type and a second asset type;
determine a forecast for a period of time based at least in part on the current weather conditions;
determine that a first asset of the first asset type of the plurality of power generating assets has an available uprate margin for production of a first amount of active power;
determine that a second asset of the second asset type of the plurality of power generating assets has capacity to generate a second amount of reactive power;
transmit a first instruction to the first asset to reduce production of reactive power by the second amount and increase production of active power by the first amount, wherein the first asset executes the first instruction; and
transmit a second instruction to the second asset to increase production of reactive power by the second amount, wherein the second asset executes the second instruction.

2. The system in accordance with claim 1, wherein the second amount is an amount of reactive power production reduced by increasing the active power production of the first asset by the first amount.

3. The system in accordance with claim 1, wherein said at least one processor is further programmed to transmit a third instruction to the second asset to reduce production of active power by a third amount, and wherein the third amount is less than the first amount, wherein the second asset executes the third instruction.

4. The system in accordance with claim 1, wherein the first asset is a wind asset, and wherein the second asset is one of a solar asset inverter and a battery inverter.

5. The system in accordance with claim 1, wherein the first asset is a solar asset, and wherein the second asset is one of a wind asset and a battery inverter.

6. The system in accordance with claim 1, wherein said at least one processor is further programmed to:
determine a first forecast for production of power by assets of the first asset type during the period of time; and
determine a second forecast for production of power by assets of the second asset type during the period of time.

7. The system in accordance with claim 6, where said at least one processor is further programmed to:
store a first production threshold associated with the first asset type and a second production threshold associated with the second asset type;
compare the second production threshold to the second forecast to determine if the second forecast is below the second production threshold; and
compare the first production threshold to the first forecast for the first asset to determine if the first forecast is above the first production threshold.

8. The system in accordance with claim 1, wherein said at least one processor is further programmed to:
determine that a first plurality of assets of the first asset type of the plurality of power generating assets have available uprate margins for production of a first total amount of additional active power; and
determine that a second plurality of assets of the second asset type of the plurality of power generating assets have capacity to generate a second total amount of reactive power, wherein the second total amount of reactive power is based on a reduction in production of reactive power by the first plurality of assets.

9. The system in accordance with claim 1, wherein said at least one processor is further programmed to:
receive a reactive power set point for the plurality of power generating assets;
determine possible reactive power generation and possible active power generation for each asset of the plurality of power generating assets;
compare the possible active power generation for each asset of the plurality of power generating assets to a production rating for the corresponding asset; and
if the possible active power generation for the asset satisfies the production rating, uprate the production of active power for the corresponding asset.

10. The system in accordance with claim 9, wherein said at least one processor is further programmed to update the possible reactive power generation for the corresponding asset based on the uprate.

11. The system in accordance with claim 10, wherein said at least one processor is further programmed to perform the uprate of the corresponding asset if the reactive power set point exceeds a sum of the possible reactive power generation for all assets of the plurality of power generating assets.

12. The system in accordance with claim 1, wherein said at least one processor is further programmed to:
determine if one or more assets of the plurality of power generating assets are operating under curtailment; and
readjust one or more operating set points of the one or more assets based on the curtailment.

13. The system in accordance with claim 12, wherein said at least one processor is further programmed to readjust operating set points associated with the plurality of power generating assets based on the curtailment.

14. The system in accordance with claim 13, wherein said at least one processor is further programmed to readjust the operating set points based on one or more of maximizing revenue from the plurality of power generating assets, reducing collector system losses, and minimizing impact on life of components.

15. A method for operating a hybrid power generation plant including a plurality of power generating assets, the method implemented by a computing device including at least one processor in communication with at least one memory device, the method comprising:
receiving current weather conditions at the plurality of power generating assets, wherein the plurality of power generating assets including a first asset type and a second asset type;
determining a forecast for a period of time based at least in part on the current weather conditions;
determining that a first asset of the first asset type of the plurality of power generating assets has an available uprate margin for production of a first amount of active power;
determining that a second asset of the second asset type of the plurality of power generating assets has capacity to generate a second amount of reactive power;

transmitting a first instruction to the first asset to reduce production of reactive power by the second amount and increase production of active power by the first amount, wherein the first asset executes the first instruction; and transmitting a second instruction to the second asset to increase production of reactive power by the second amount, wherein the second asset executes the second instruction.

16. The method in accordance with claim 15, wherein the second amount is an amount of reactive power production reduced by increasing the active power production of the first asset by the first amount, wherein the second asset reduces production of active power by a third amount, and wherein the third amount is less than the first amount.

17. The method in accordance with claim 15 further comprising:

determining a first forecast for production of power by assets of the first asset type during the period of time;

determining a second forecast for production of power by assets of the second asset type during the period of time;

storing a first production threshold associated with the first asset type and a second production threshold associated with the second asset type;

comparing the second production threshold to the second forecast to determine if the second forecast is below the second production threshold; and comparing the first production threshold to the first forecast for the first asset to determine if the first forecast is above the first production threshold.

18. The method in accordance with claim 15 further comprising determining that a first plurality of assets of the first asset type of the plurality of power generating assets have available uprate margin for production of a first total amount of additional active power; and determining that a second plurality of assets of the second asset type of the plurality of power generating assets have capacity to generate a second total amount of reactive power, wherein the second total amount of reactive power is based on a reduction in production of reactive power by the first plurality of assets generating the first total amount of additional active power.

19. The method in accordance with claim 15 further comprising:

receiving a reactive power set point for the plurality of power generating assets;

determining possible reactive power generation and possible active power generation for each asset of the plurality of power generating assets;

comparing the possible active power generation for each asset of the plurality of power generating assets to a production rating for the corresponding asset; and if the possible active power generation for the asset corresponds to the production rating, uprating production of active power for the corresponding asset.

20. The method in accordance with claim 19 further comprising:

updating the possible reactive power generation for the corresponding asset based on the uprate; and performing the uprate of the corresponding asset if the reactive power set point exceeds a sum of the possible reactive power generation for all assets of the plurality of power generating assets.

21. The method in accordance with claim 15 further comprising determining if one or more assets of the plurality of power generating assets are operating under curtailment;

readjusting one or more operating set points of the one or more assets based on the curtailment; and readjusting operating set points associated with the plurality of power generating assets based on the curtailment.

* * * * *